(12) United States Patent
Evans et al.

(10) Patent No.: US 8,443,425 B1
(45) Date of Patent: May 14, 2013

(54) REMOTELY AUTHENTICATING USING A MOBILE DEVICE

(75) Inventors: Cary D. E. Evans, Encinitas, CA (US); Alan F. Buhler, Escondido, CA (US); Joseph Elwell, San Diego, CA (US); John W. Zackrison, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 943 days.

(21) Appl. No.: 12/541,851

(22) Filed: Aug. 14, 2009

(51) Int. Cl.
  *G06F 7/04* (2006.01)
  *G06F 15/16* (2006.01)
  *G06F 17/30* (2006.01)

(52) U.S. Cl.
  USPC .................................... 726/5; 726/26

(58) Field of Classification Search ............... 726/5, 26
  See application file for complete search history.

(56) References Cited

U.S. PATENT DOCUMENTS

| | | | |
|---|---|---|---|
| 6,430,407 B1 * | 8/2002 | Turtiainen | 455/411 |
| 6,696,941 B2 * | 2/2004 | Baker | 340/539.1 |
| 6,732,278 B2 * | 5/2004 | Baird et al. | 726/7 |
| 6,934,535 B2 * | 8/2005 | Pyhalammi | 455/415 |
| 7,076,797 B2 * | 7/2006 | Loveland | 726/4 |
| 7,177,865 B2 * | 2/2007 | Sasaki et al. | 1/1 |
| 7,624,278 B2 * | 11/2009 | Paden et al. | 713/182 |
| 7,627,022 B2 * | 12/2009 | Monroe et al. | 375/222 |
| 7,706,778 B2 * | 4/2010 | Lowe | 455/411 |
| 2003/0177250 A1 * | 9/2003 | Oliver et al. | 709/229 |
| 2004/0044554 A1 * | 3/2004 | Bull et al. | 705/8 |
| 2008/0235782 A1 * | 9/2008 | Johnson | 726/12 |
| 2008/0260149 A1 * | 10/2008 | Gehrmann | 380/247 |

\* cited by examiner

*Primary Examiner* — William Powers
(74) *Attorney, Agent, or Firm* — Osha Liang LLP (57) ABSTRACT

In general, in one aspect, the invention relates to a method for authenticating using a mobile device of a user. The method involves receiving a request for access to a secure resource and requesting credentials for accessing the secure resource from the user. The method further involves receiving a request to obtain the credentials from the mobile device, where the mobile device includes a mobile device user interface and a credential interface, and requesting the credentials from the mobile device. The method still further involves, in response to the credential interface authenticating the user on the mobile device using input received from the mobile device user interface, receiving the credentials from the mobile device. The method further involves determining that the user is authorized to access the secure resource based on the credentials and providing the user with access to the secure resource.

32 Claims, 6 Drawing Sheets

REMOTELY AUTHENTICATING USING A MOBILE DEVICE

BACKGROUND

Security of information is an important consideration in a variety of modern transactions and storage. For example, electronic mail accounts and access to automated teller machines (ATM) are areas where authentication (i.e., proof or verification that the account being accessed is authorized by the owner of the account) have long been required. However, as fraud, identify theft, and similar activities become more prevalent, additional measures for protecting other devices and accounts may be necessary to fully protect information. Credit card transactions and certain telephone communications are examples where authentication is increasingly required in order to proceed with a transaction or complete a customer service call, respectively.

In all such cases where authentication is required, an account holder must be able to provide security information (i.e., credentials) in order to receive access to an account or other secure information. In some cases, the account holder is required to change such credentials on a periodic basis. In other cases, the credentials are complex, including a combination of secure passwords and personal questions. Account holders are often encouraged to avoid using credentials that are familiar, such as names of pets or children, or numbers in the form of birthdays or anniversaries. As the number of accounts that an account holder maintains increases, the account holder may have more difficulty remembering the various credentials and keeping such credentials secure.

SUMMARY

In general, in one aspect, the invention relates to a method for authenticating using a mobile device of a user. The method involves receiving a request for access to a secure resource and requesting credentials for accessing the secure resource from the user. The method further involves receiving a request to obtain the credentials from the mobile device, where the mobile device includes a mobile device user interface and a credential interface, and requesting the credentials from the mobile device. The method still further involves, in response to the credential interface authenticating the user on the mobile device using input received from the mobile device user interface, receiving the credentials from the mobile device. The method further involves determining that the user is authorized to access the secure resource based on the credentials and providing the user with access to the secure resource.

In general, in one aspect, the invention relates to a method for providing credentials for accessing a secure resource. The method involves receiving a request for credentials from a resource server configured to provide access to a secure resource, where the resource server is instructed to obtain the credentials from a mobile device including a mobile device user interface and a credential interface and, in response to the request for the credentials, receiving authentication information for a user using the mobile device user interface of the mobile device. The method further involves authenticating the user based on the authentication information using the credential interface of the mobile device and sending the credentials to the resource server after authenticating the user using the authentication information, where the resource server provides the user with access to the secure resource after authenticating the user using the credentials.

In general, in one aspect, the invention relates to a computer readable medium including instructions executable by a processor to perform a method of authenticating using a mobile device of a user. The method involves receiving a request for access to a secure resource and requesting credentials for accessing the secure resource from the user. The method further involves receiving a request to obtain the credentials from the mobile device, where the mobile device includes a mobile device user interface and a credential interface, and requesting the credentials from the mobile device. The method still further involves, in response to the credential interface authenticating the user on the mobile device using input received from the mobile device user interface, receiving the credentials from the mobile device. The method further involves determining that the user is authorized to access the secure resource based on the credentials and providing the user with access to the secure resource.

In general, in one aspect, the invention relates to a computer readable medium including instructions executable by a processor to perform a method of providing credentials for accessing a secure resource. The method involves receiving a request for credentials from a resource server configured to provide access to a secure resource, where the resource server is instructed to obtain the credentials from a mobile device including a mobile device user interface and a credential interface and, in response to the request for the credentials, receiving authentication information for a user using the mobile device user interface of the mobile device. The method further involves authenticating the user based on the authentication information using the credential interface of the mobile device and sending the credentials to the resource server after authenticating the user using the authentication information, where the resource server provides the user with access to the secure resource after authenticating the user using the credentials.

In general, in one aspect, the invention relates to a system for authenticating using a mobile device. The system includes memory and a processor. The processor of the system executes on a user application, which is configured to receive a request to obtain credentials for accessing a secure resource on a resource server, where the request is generated by the user on a user interface, and send a request for the credentials to a mobile device, where the mobile device includes a mobile device user interface and a credential interface. The user application, executed on by the processor of the system, is also configured to, in response to the credential interface authenticating the user on the mobile device using input received from the mobile device user interface, receive the credentials from the mobile device. The processor of the system also executes on a security interface, which is configured to receive a request for accessing the secure resource from a user on the user interface and send to the user interface the request for credentials to the resource server. The security interface, executed on by the processor of the system, is further configured to receive the credentials for the secure resource from the user application and send the credentials to the resource server. The security interface, executed on by the processor of the system, is further configured to receive from the resource server access to the secure resource based on the credentials, where access is sent to the user on the user interface.

Other aspects and advantages of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide for remote authentication using a mobile device. More specifically, one or more embodiments of the invention provide for securely storing credentials on a mobile device. One or more embodiments of the invention also provide for providing the credentials for accessing a secure resource using the mobile device. The credentials may be, for example, in the form of a personal identification number (PIN), a user name, a password, some other information, or any suitable combination thereof. The credentials may include, for example, numbers, lower case letters, upper case letters, symbols, some other character, or some suitable combination thereof. The credentials may also include items in a non-written format, including but not limited to sound waves, fingerprints, retinal prints, and other forms of biometric personal identification. In one or more embodiments of the invention, an account holder is a user of a server configured to manage the secure resource. A user may include, but is not limited to, the individual associated with an account, a person authorized by the account holder to access an account, or a legal guardian of the account holder. A secure resource may be a variety of services and/or accounts that require credentials for access, including but not limited to an electronic mail account, a bank account, a credit card or check card account, a financial management account, or airline passenger information. The secure resource may be accessed in a number of different manners, including but not limited to accessing the secure resource via a web server, a desktop computer, a "dumb" terminal, a thin client, and/or a kiosk.

Figure 1:
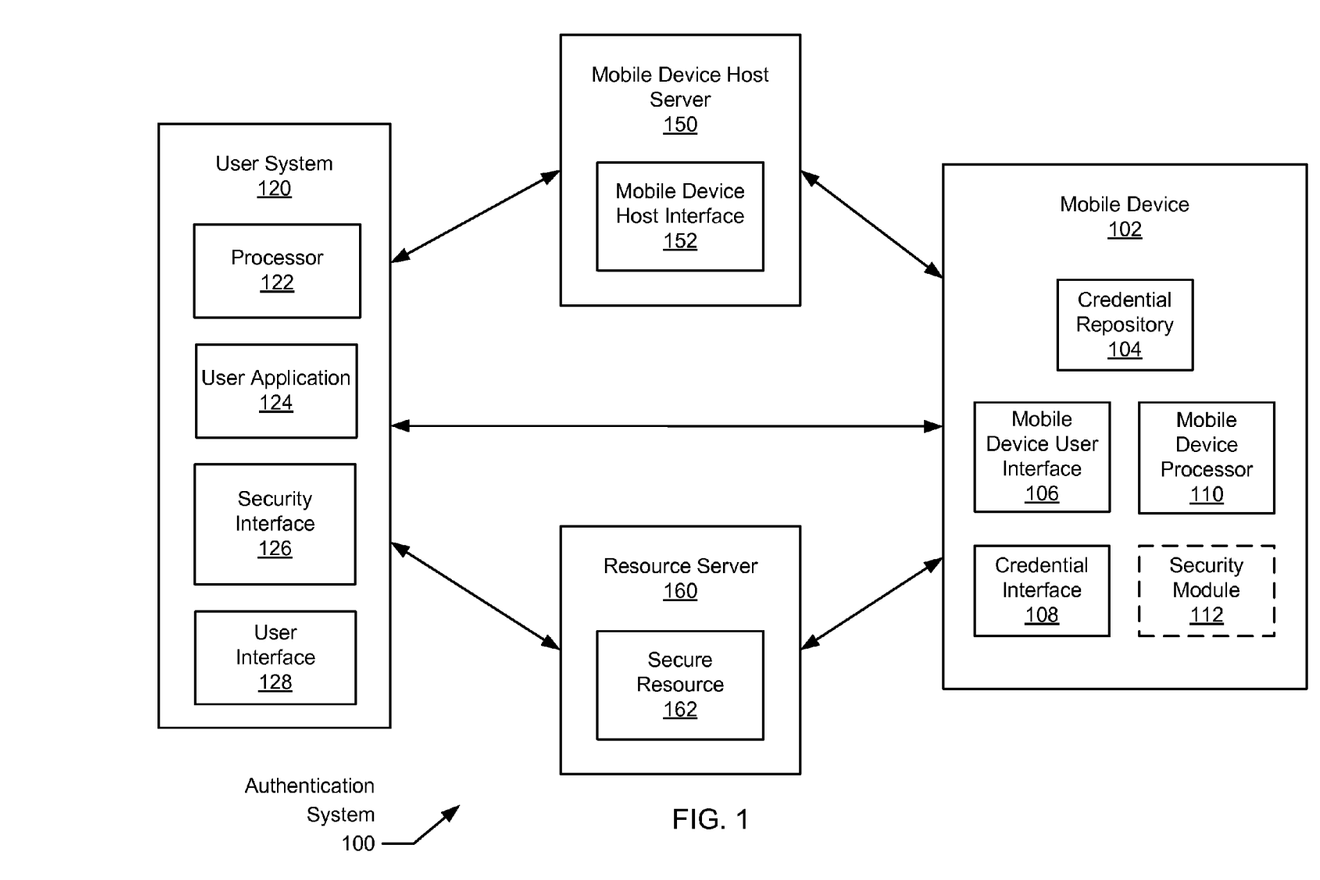
FIG. 1 shows a system in accordance with one or more embodiments of the invention.

FIG. 1 shows an authentication system (100) for remote mobile device authentication in accordance with one or more embodiments of the invention. The authentication system (100) includes a mobile device (102), a user system (120), a mobile device host server (150), and a resource server (160). The mobile device (102) includes a credential repository (104), a mobile device user interface (106), a credential interface (108), and a mobile device processor (110). Optionally, the mobile device (102) may also include a security module (112). The user system (120) includes a processor (122), a user application (124), a security interface (126), and a user interface (128). The mobile device host server (150) includes a mobile device host interface (152). The resource server (160) includes a secure resource (162). Each of these components is described with respect FIG. 1 below.

The authentication system (100) may be a separate system, a plug-in of another system, a web-based service, a service residing on a desktop computer, or configured in some other way. One of ordinary skill in the art will appreciate that embodiments of the invention are not limited to the configuration shown in FIG. 1.

In one or more embodiments of the invention, the mobile device (102) is operated by a user of some kind (e.g., a person, a robot, automated component, etc.). The mobile device (102) may be any device configured to send, store, and receive data over a network. In addition, the mobile device (102) may be configured to send output to, and receive input from, a user. The mobile device (102) may also be any device configured to require authentication of the user before granting access the mobile device, receiving information, and/or sending information. Examples of a mobile device (102) may include, but are not limited to, a smart device, a desktop computer, a laptop computer, a smart phone, a mobile phone, and a personal digital assistant (PDA).

In one or more embodiments of the invention, the mobile device (102) is configured to interact with the user system (120). More specifically, the credential interface (108) of the mobile device (102) may be configured to communicate with the user application (124) of the user system (120). The credential interface (108) of the mobile device (102) may be (or contain) a variety of applications, including but not limited to enterprise software, content access software, or financial software, where each application is capable of communicating with the user application (124). The credential interface (108) may work in conjunction with one or a number of operating system(s), utility(ies), and/or programming language(s). In one or more embodiments of the invention, the credential interface (108) may be a web-based communication component. For example, the mobile device (102) may include a variety of software application(s) configured to communicate with the user system (120). The configuration of the mobile device (102) may also be modified in order to communicate with the user system (120).

In one example, the credential interface (108) of the mobile device (102) may be configured to display web page(s) (i.e., web content). More specifically, the credential interface (108) may be configured to render Hypertext Markup Language (HTML) provided by a web server. For example, the credential interface (108) may be a web browser(s) used by the mobile device (102) to access web pages (i.e., web content) over the Internet (or other Wide Area Network or Local Area Network). The credential interface (108) may also be part of, or contain a form of, a mobile application, an application programming interface, a plug-in, or some other interface capable of communicating with the user application (124).

In one or more embodiments of the invention, the mobile device (102) is further configured to interact with the user. More specifically, the mobile device user interface (106) may be configured to receive input from the user and to present information to the user. The mobile device user interface (106) may include a keypad, a keyboard, a touch screen, a mouse, a voice-activated interface, some other means of interacting with the user, or any suitable combination thereof. In one or more embodiments of the invention, the mobile device user interface (106) is configured to receive authentication information from the user. The mobile device user interface (106) may also be configured to receive a request from the user to store credentials in the credential repository (104). The mobile device user interface (106) may further be configured to send credentials to the user application (124) and/or to the resource server (160) on behalf of the user. In one or more embodiments of the invention, the mobile device user interface (106) is configured to receive requests from the user to modify credentials. The mobile device user interface (106) may also be configured to receive requests from the user to store and/or retrieve credentials on the mobile device host server (150).

In one or more embodiments of the invention, the mobile device (102) is further configured to store and retrieve credentials. More specifically, the mobile device (102) may be configured to retrieve information from, and store information in, the credential repository (104). The credential repository (104) may also be configured to store credentials obtained by the mobile device user interface (106). The credential repository (104) may include a database, an extensible markup language (XML) document, a spreadsheet, a plain text document, or any other type of format suitable for storing the credentials. Further, the credential repository (104) may be distributed across multiple storage locations (e.g., the mobile device host server (150)) and/or different storage formats.

In one or more embodiments of the invention, the mobile device (102) is optionally configured to verify that the user is authorized to access the mobile device. More specifically, the security module (112) may be configured to authenticate the user before allowing the user to access the mobile device (102). In addition, the security module (112) may be configured to authenticate the user prior to transmitting and/or receiving credentials.

In one or more embodiments of the invention, the user system (120) is a computing device operated by the user of the mobile device (102). Examples of the user system (120) may include, but are not limited to, a desktop computer, a laptop computer, an ATM machine connected to a resource server (160), a kiosk, and/or a personal digital assistant (PDA).

In one or more embodiments of the invention, the user system (120) is configured to interact with the mobile device (102). More specifically, the user application (124) of the user system (120) may be configured to communicate with the credential interface (108) of the mobile device (102). The user application (124) may be, or may contain a form of, a web-based communication device that is capable of communicating with the credential interface (108). In one or more embodiments of the invention, the mobile device (102) is identified before communication is initiated by the user application (124). In some cases, the user system (120) may be configured to interact with a number of mobile devices (e.g., 102), where each particular mobile device (e.g., 102) may be identified prior to communication being initiated by the user application (124). A particular mobile device (e.g., 102) may also be identified and/or modified for the user application (124) during runtime. The user application (124) may be configured to interact with multiple mobile devices (e.g., 102) simultaneously.

In one or more embodiments of the invention, the user application (124) is further configured to use the security interface (126) to communicate with the resource server (160), the mobile device (102), and/or the mobile device host server (150). The user application (124) may be, or may contain a variety of applications, including but not limited to enterprise software, content access software, or financial software, where each application is capable of communicating with the user application (124). The user application (124) may work in conjunction with one or a number of operating system(s), utility(ies), and/or programming language(s). In one or more embodiments of the invention, the user application (124) may be a web-based communication component. For example, the user application (124) may be include a variety of software application(s) configured to communicate with the mobile device (102). The configuration of the user application (124) may also be modified in order to communicate with the mobile device (102).

In one example, the user application (124) may be further configured to display web page(s) (i.e., web content). In such a case, the security interface (126) may be any application capable of rendering Hypertext Markup Language (HTML) provided by a web server. For example, the security interface (126) may be, for example, a browser extension or plug-in extending the user application (124), where the user application (124) is a web browser(s) used by the user system (120) to access web pages (i.e., web content) over the Internet (or other Wide Area Network or Local Area Network). More specifically, the browser extension(s) may provide an open framework for adding features to the security interface (126). In this case, a browser extension may be an application that extends the functionality of the security interface (126) using the open framework. The security interface (126) may interact with the resource server (160) using the browser extension (s). Further, the browser extension(s) may be configured to interact with the user interface (128) of the user system (120).

In one or more embodiments of the invention, the user system (120) is further configured to interact with the user. More specifically, the user interface (128) of the user system (120) may be configured to receive requests from the user and to present information to the user. The user interface (128) may include a keypad, a keyboard, a touch screen, a mouse, a voice-activated interface, some other means of interacting with the user, or any suitable combination thereof. In one or more embodiments of the invention, the user interface (128) is configured to authenticate the user. The user interface (128) may also be configured to receive requests from the user to store credentials in and/or retrieve credentials from the credential repository (104). The user interface (128) may further be configured to receive requests from the user to send credentials to the resource server (160). In one or more embodiments of the invention, the user interface (128) is configured to receive requests from the user to modify credentials. The user interface (128) may also be configured to receive requests from the user to store and/or retrieve credentials on the mobile device host server (150).

In one or more embodiments of the invention, the mobile device host server (150) is configured to interact with the security interface (126) using the mobile device host interface (152). More specifically, the mobile device host interface (152) may be configured to receive a request for data (e.g., credentials) from the security interface (126). The mobile device host interface (152) may also be configured to request input data (e.g., authentication information) from the security interface (126). In one or more embodiments of the invention, the mobile device host server (150) is configured to support various data formats of the security interface (126).

In one or more embodiments of the invention, the mobile device host server (150) is configured to interact with the credential interface (108) using the mobile device host interface (152). More specifically, the mobile device host interface (152) may be configured to receive data (e.g., credentials) from the credential interface (108). The mobile device host interface (152) may also be configured to request input data (e.g., authentication information) from the credential interface (108). In one or more embodiments of the invention, the mobile device host server (150) is configured to support various data formats of the credential interface (108).

Requests for input data from the mobile device host server (150) may specify, but are not limited to, the user system (120), the mobile device (102), the location of the input data, Uniform Resource Identifier (URI) (e.g., Uniform Resource Locator (URL), web address, etc.), an additional support application (e.g., associated with security or credentials), or any combination thereof. In addition, the mobile device host interface (152) may be configured to send output data (e.g., credentials) to a user using the security interface (126) of the user system (120) and/or the credential interface (108) of the mobile device (102).

In one or more embodiments of the invention, the resource server (160) is configured to interact with the security interface (126) using an application interface(s) (not shown). More specifically, the application interface(s) may be configured to receive input data (e.g., credentials) from the security interface (126). The application interface(s) may also be configured to request input data from the security interface (126). In one or more embodiments of the invention, the resource server (160) is configured to support various data formats of the security interface (126). Requests for input data may specify, but are not limited to, the user system (120), the mobile device (102), guidance for obtaining the input data, Uniform Resource Identifier (URI) (e.g., Uniform Resource Locator (URL), web address, etc.), some other application (e.g., associated with security or credentials), or any combination thereof. In addition, the application interface(s) may be configured to send output data (e.g., access to the secure resource (162)) to a user using the security interface (126) executing on the user system (120). The resource server (160) may likewise be configured to interact with the credential interface (108) using an application interface (not shown).

In one or more embodiments of the invention, the resource server (160) is configured to host the secure resource (162). The resource server (160) may also host an application interface (not shown) configured to interact directly with the mobile device (102). For example, the functionality provided by the security interface (126), as discussed above, may be implemented on the resource server (160). In such a case, the user application (124) may interact directly with the resource server (160) using the security interface (126). In another example, the functionality provided by the credential interface (108), as discussed above, may similarly be implemented on the resource server (160).

Figure 2A:
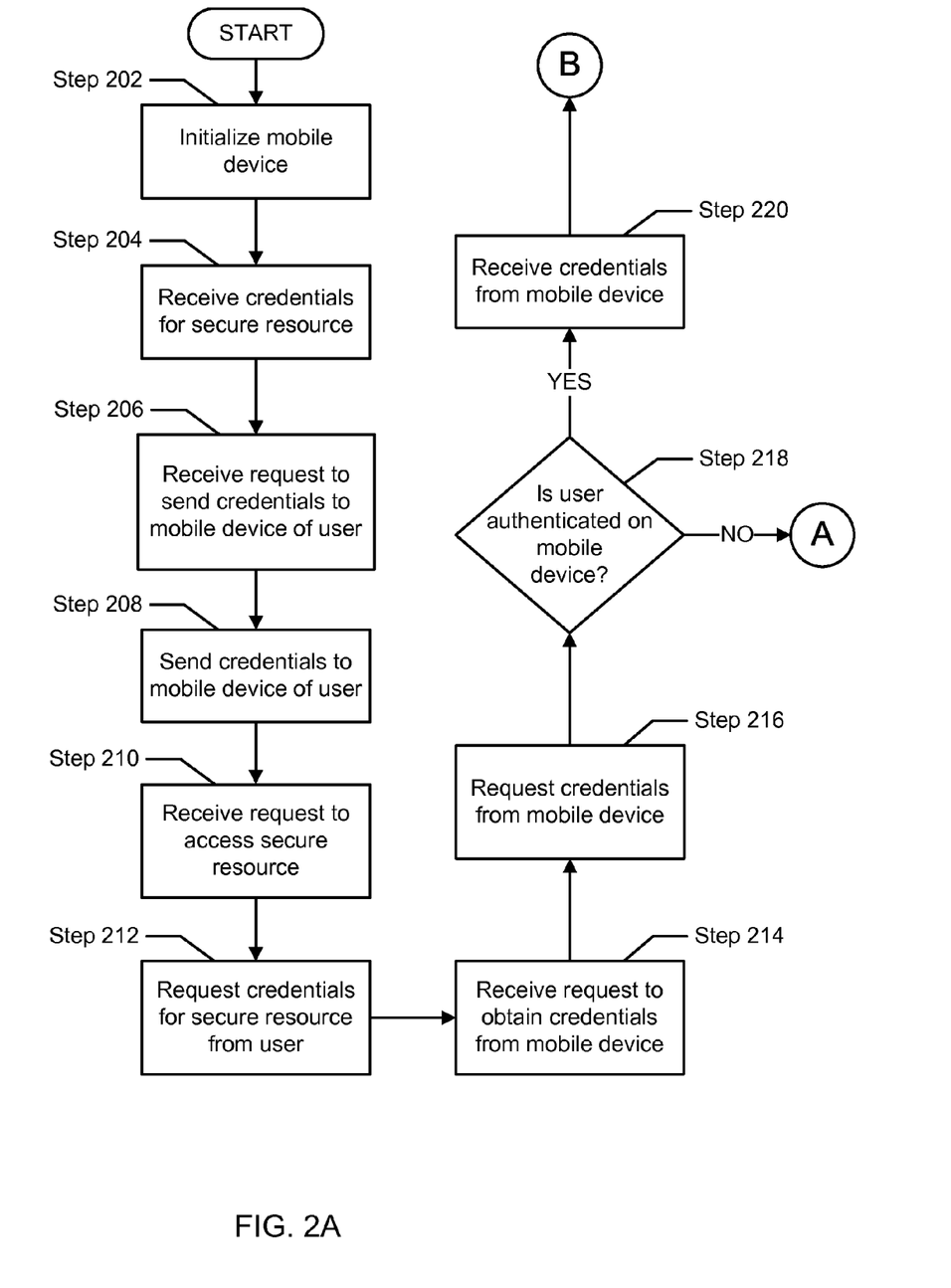
FIGS. 2A-2B show a flowchart for remote mobile device authentication in accordance with one or more embodiments of the invention.
Figure 2B:
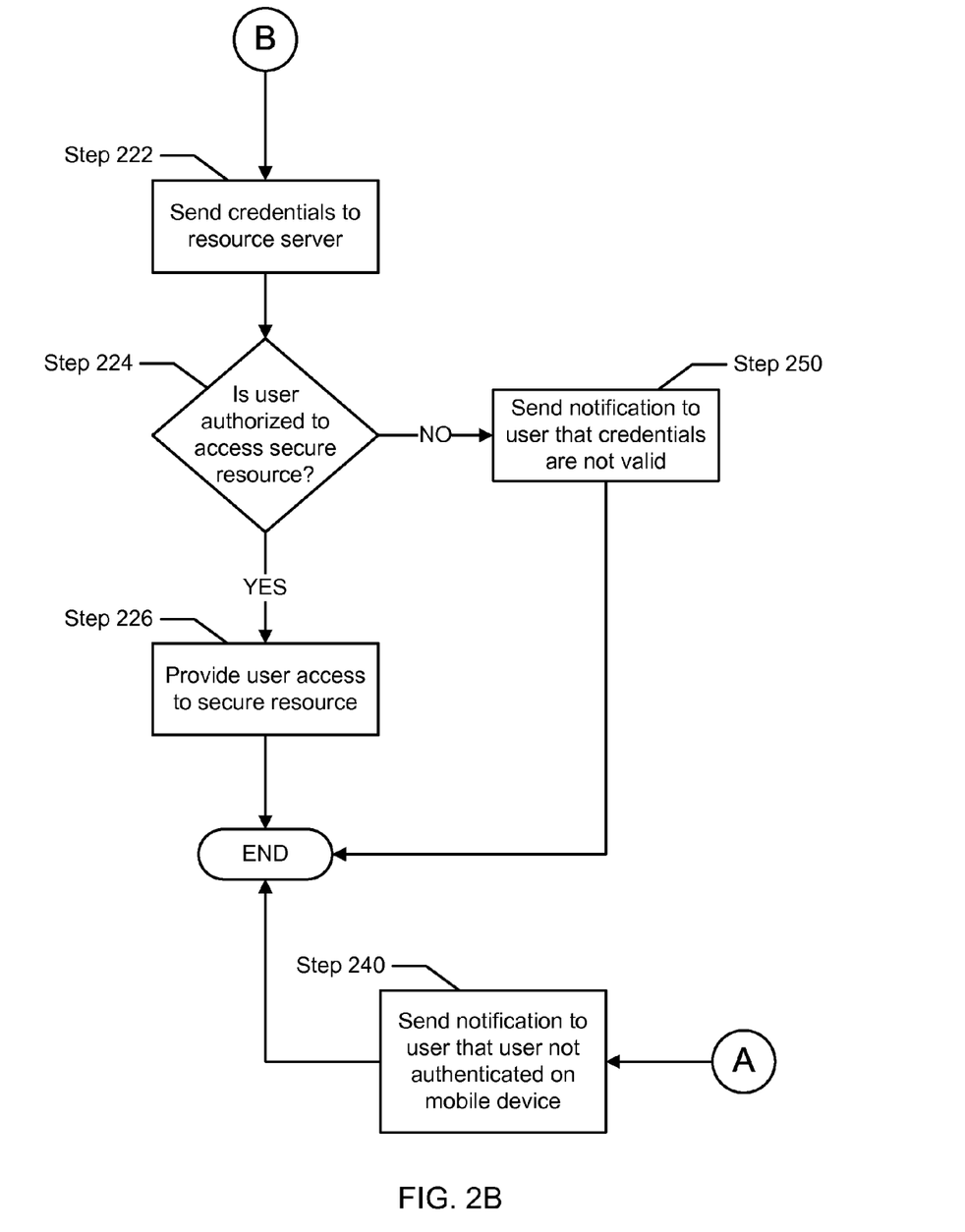

FIGS. 2A-2B show a flowchart of a method for remote authentication using a mobile device in accordance with one or more embodiments of the invention. While the various steps in this flowchart are presented and described sequentially, one of ordinary skill will appreciate that some or all of the steps may be executed in different orders, may be combined or omitted, and some or all of the steps may be executed in parallel. In addition, a person of ordinary skill in the art will appreciate that other steps, omitted in FIGS. 2A-2B, may be included in this flowchart. Accordingly, the specific arrangement of steps shown in FIGS. 2A-2B should not be construed as limiting the scope of the invention.

Beginning with FIG. 2A, in step 202, a mobile device is configured to be associated with a user. More specifically, configuring the mobile device may allow the mobile device to send and receive credentials for accessing a secure resource. Step 202 may optionally be performed at any other time in the method described with respect to FIG. 2. Those skilled in the art will appreciate that initializing the mobile device may also include configuring settings related to the mobile device. In one or more embodiments of the invention, a particular computer, as described with respect to FIG. 5 below, is used to initialize the mobile device.

In step 204, credentials for a secure resource are received. In some cases, the credentials may be obtained from the user. In other examples, the credentials may be received as input from the user by manual entry, automatically uploaded from a different source, received by some other method, or any suitable combination thereof. In one or more embodiments of the invention, the credentials may be modified from an original version of the credentials, generating revised credentials. At this stage, the credentials may be associated with the secure resource to which the credentials provide access. In one or more embodiments of the invention, a particular computer, as described with respect to FIG. 5 below, is used to receive the credentials for the secure resource.

In step 206, a request to send the credentials to a mobile device of the user is received. In one or more embodiments of the invention, the request is sent to more than one mobile device, where each mobile device is initialized as described above with respect to step 202. Some form of authentication or verification, such as entry of a password or acknowledgement, may be required before the request may be verified as originating from the user. Communication with the mobile device may be established using a variety of manners, including but not limited to an application programming interface. Optionally, the user may provide the credentials by inputting the credentials directly into the mobile device. In any case, the request to send the credentials to a mobile device of the user may specify a data format supported by the mobile device. In one or more embodiments of the invention, a particular computer, as described with respect to FIG. 5 below, is used to receive the request to send the credentials to the mobile device of the user.

In step 208, the credentials are sent to the mobile device of the user. In one or more embodiments of the invention, the credentials are subsequently stored in the mobile device. The credentials may also be stored a remote location from the mobile device, such as, a remote server or a portable memory device. The credentials may be transmitted in a format supported by the mobile device. In one or more embodiments of the invention, a particular computer, as described with respect to FIG. 5 below, is used to send the credentials to the mobile device of the user.

In step 210, a request to access the secure resource is received. The credentials may be required to access the secure resource. The request to access the secure resource may originate from the user. In some cases, the request to access the secure resource may be sent to a resource server associated with the secure resource. In this case, the request to access the secure resource may be sent in a format supported by the resource server and/or the secure resource. In one or more embodiments of the invention, a particular computer, as described with respect to FIG. 5 below, is used to receive the request to access the secure resource.

In step 212, the credentials to the secure resource are requested from the user. In one or more embodiments of the invention, the credentials are the same as those described above with respect to steps 204-208. The credentials may be associated with the secure resource to which the credentials provide access. The credentials may be requested by a resource server managing access to the secure resource. In one or more embodiments of the invention, a particular computer, as described with respect to FIG. 5 below, is used to request the credentials to the secure resource from the user.

In step 214, a request is received to obtain the credentials from the mobile device. In one or more embodiments of the invention, the request originates from the user. The request may be a default setting, so that the request to receive the credentials from the mobile device is automatically received upon the completion of step 212. In one or more embodiments of the invention, a particular computer, as described with respect to FIG. 5 below, is used to obtain the request to receive the credentials from the mobile device.

In step 216, the credentials are requested from the mobile device. In one or more embodiments of the invention, the request to obtain credentials from the mobile device is sent on behalf of the user to the mobile device. The mobile device may be configured to authenticate the user before the request to obtain the credentials from the mobile device is verified. Examples of authentication may include, but are not limited to, inputting a password or personal identification number, voice recognition, and/or biometric input (e.g., fingerprint scan, retinal scan, etc.). The request to obtain the credentials from the mobile device may include identification information for the secure resource to which the credentials grant access. The request to obtain the credentials may also contain other information useful for establishing the appropriate credentials for the secure resource. The request to obtain the credentials from the mobile device may be sent in a format supported by the mobile device. In one or more embodiments of the invention, a particular computer, as described with respect to FIG. 5 below, is used to receive the request to obtain the credentials from the mobile device.

In step 218, a determination is made as to whether the user is authenticated on the mobile device. In one or more embodiments of the invention, the mobile device authenticates the user before the credentials may be obtained from the mobile device. Examples of authentication may include, but are not limited to inputting a password or personal identification number, voice recognition, and/or biometric input (e.g., fingerprint scan, retinal scan, etc.). If the user is not authenticated on the mobile device, then the process proceeds to step 240, where a notification is sent to the user that the user is not authenticated on the mobile device and the process ends. The user may not be authenticated on the mobile device if, for example, a password is incorrectly entered after a predetermined number of attempts or if a predetermined amount of time has lapsed before the correct authentication information has been received from the user. In one or more embodiments of the invention, a computer, as described with respect to FIG. 5 below, is used to present to user the notification that the user was not properly authenticated on the mobile device. If the user is authenticated on the mobile device, then the process proceeds to step 220, where the credentials are obtained from the mobile device. In one or more embodiments of the invention, a particular computer, as described with respect to FIG. 5 below, is used to determine whether the user is authenticated on the mobile device.

In step 220, the credentials are obtained from the mobile device. In one or more embodiments, the credentials are obtained in a similar manner as the request to obtain the credentials is transmitted. Optionally, the credentials may have been altered or modified by, for example, the user to generate revised credentials. In such a case, the revised credentials are sent by the mobile device. In any case, the credentials are sent in a format supported by the resource server and/or the secure resource. In one or more embodiments of the invention, a particular computer, as described with respect to FIG. 5 below, is used to receive the credentials from the mobile device.

In step 222, the credentials are sent to the resource server. If revised credentials were received from the mobile device, as described above with respect to step 220, then the revised credentials are sent to the resource server. In one or more embodiment of the invention, step 222 may be omitted if the resource server is configured to receive the credentials directly from the mobile device. In one or more embodiments of the invention, a particular computer, as described with respect to FIG. 5 below, is used to send the credentials to the resource server.

In step 224, a determination is made by the resource server as to whether the user is authorized to access the secure resource based on the credentials. If the user is not authorized to access the secure resource based on the credentials, then the process proceeds to step 250, where a notification is sent to the user that the credentials are not valid and the process ends. In one or more embodiments of the invention, a particular computer, as described with respect to FIG. 5 below, is used to present to the user the notification that the credentials are invalid. If the user is authorized to access the secure resource based on the credentials, then the process proceeds to Step 226, where the user is provided with access to the secure resource. In one or more embodiments of the invention, a particular computer, as described with respect to FIG. 5 below, is used to provide the user with access to the secure resource.

FIGS. 3A-4B illustrate examples for remote mobile device authentication in accordance with one or more embodiments of the invention.

EXAMPLE A

Figure 3A:
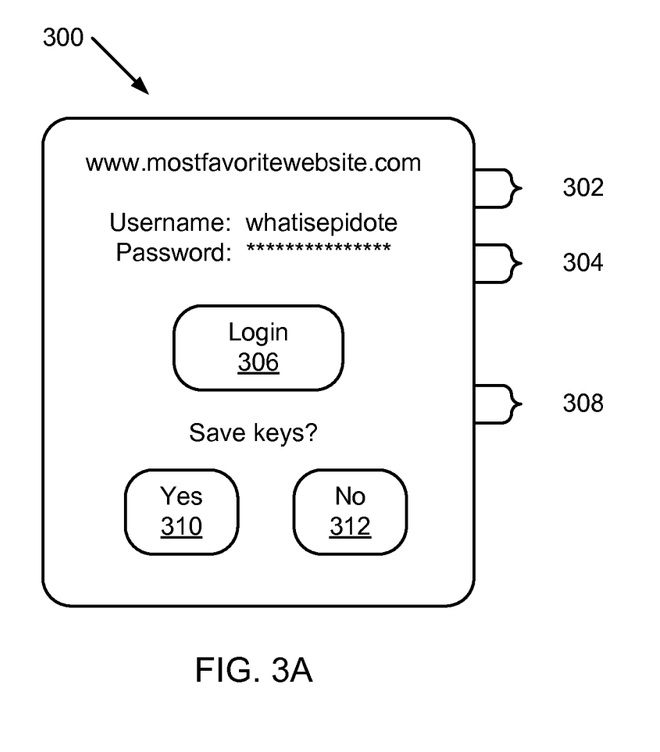
FIGS. 3A-3B and 4A-4B show examples of flow diagrams depicting one or more embodiments of the invention.
Figure 3B:
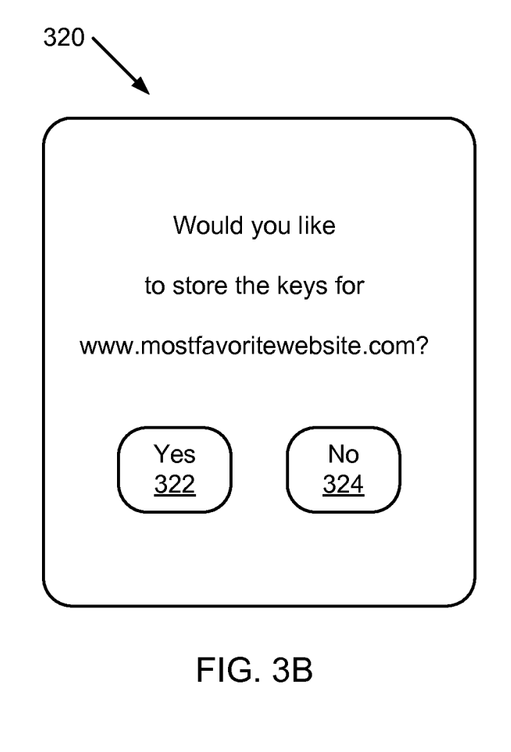

Consider an example in FIGS. 3A and 3B where a user uses her home computer to store credentials for accessing a secure website. FIG. 3A shows a user interface (300) on the user's computer that is presented when the user accesses the login page to the secure website. The top portion of the user interface (300) shows www.mostfavoritewebsite.com as the Uniform Resource Locator (URL) of the website (302). Underneath the URL of the website (302) on the user interface (300) are the credentials (304). In this case, the credentials (304) are in the form of a username and a password, and the user has entered the credentials (304) as whatisepidote for a username and encrypted text as a password. The user has the option of logging into the secure website by pressing the login pushbutton (306). Alternatively, at the bottom portion of the user interface (300), the user has the option of saving the credentials, as indicated by the inquiry (308). Here, the user may choose to save the credentials by selecting "Yes" (310) or choose not to save the credentials by selecting "No" (312).

Continuing with FIG. 3A, if the user chooses to save the credentials by selecting "Yes" (310), then the credentials are sent to the mobile device, as shown in FIG. 3B. The mobile device may have previously been configured to communicate with the user's computer prior to logging onto the secure website, as in this example. In one or more embodiments of the invention (e.g., when the mobile device is not yet established or when more than one mobile device is recognized by the user's computer), an additional window or input field may appear after the user selects "Yes" (310), where the additional window or input field requests information from the user, such as, selection of a mobile device, configuration of a mobile device, and/or a password.

Referring to FIG. 3B, FIG. 3B shows a mobile device user interface (320) in response to receiving the credentials from the user system as described with respect to FIG. 3A. The mobile device user interface (320) asks the user if she wishes to store the credentials for the secure website www.mostfavoritewebsite.com in the mobile device (320). The user may choose to save the credentials by selecting "Yes" (322) or not save the credentials by selecting "No" (324).

Continuing with FIG. 3B, if the user chooses to save the credentials by selecting "Yes" (322), then the credentials are associated with the website and saved to the mobile device. In one or more embodiments of the invention, when the user selects "Yes" (322), an additional window or field may appear requesting information from the user, such as, for example, a confirmation of wanting to save the credentials or a password.

EXAMPLE B

Figure 4A:
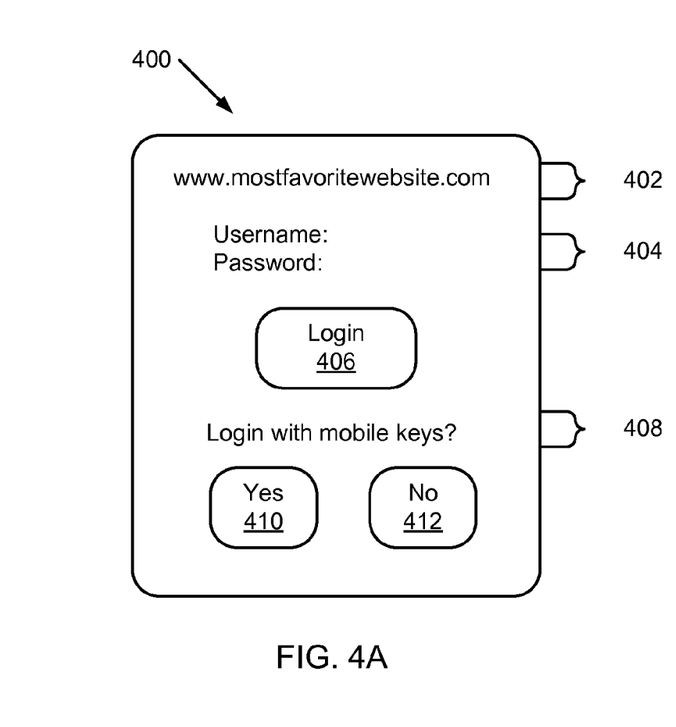
Figure 4B:
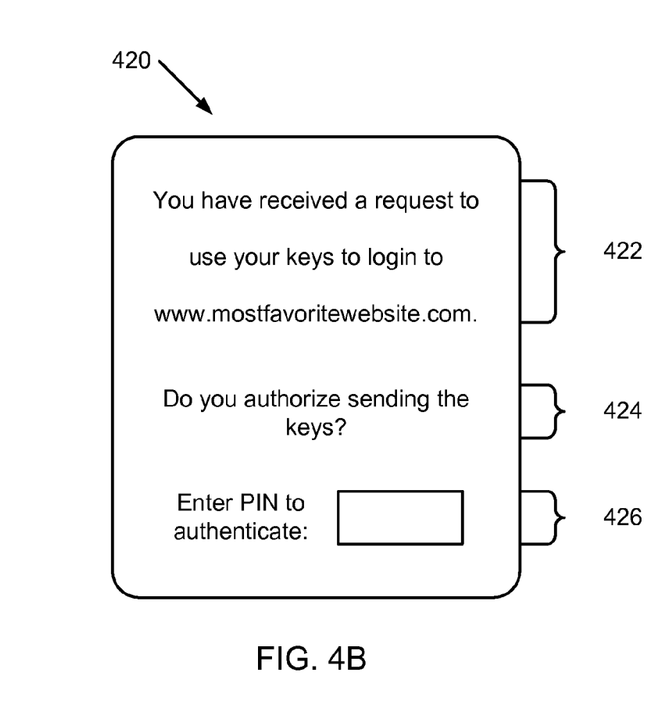

Consider an example in FIGS. 4A and 4B where a user specifies that credentials stored on a mobile device should be used to access a secure website presented on her home computer. FIG. 4A shows a user interface (400) on the user's computer that is presented when the user accesses the login page to the secure website. The top portion of the user interface (400) shows www.mostfavoritewebsite.com as the URL of the website (402). Underneath the URL of the website (402) on the user interface (400) input fields for requesting for the credentials (404) needed to access the website (402). In this case, the credentials (404) are in the form of a username and a password. While the user may manually enter the credentials (404), in this example the user has refrained from manually entered the credentials (404). When the credentials (404) are entered, the user has the option of logging into the secure website by pressing the login input button (406). Alternatively, at the bottom portion of the user interface (400), the user has the option specifying that the credentials should be retrieved (404) from the mobile device to access the website (402). Here, the user may choose to retrieve the credentials from the mobile device by selecting "Yes" (410) or choose not to retrieve the credentials from the mobile device by selecting "No" (412).

Continuing with FIG. 4A, if the user chooses to retrieve the credentials from the mobile device by selecting "Yes" (410), then a request for the credentials (404) to the website (402) are sent to the mobile device. In one or more embodiments of the invention, when the user selects "Yes" (410), an additional window or field may appear requesting information from the user, such as, for example, requesting confirmation that the credentials should be retrieved from a default mobile device, selection of a mobile device to send the request, and/or a password.

Referring to FIG. 4B, FIG. 4B shows a mobile device user interface (420) in response to receiving a request for the credentials from the user system as described with respect to FIG. 4A. The top portion (422) of the mobile device user interface (420) informs the user that the mobile device has received a request for the credentials to login to www.mostfavoritewebsite.com. The top portion (422) may include other information, such as information related to the originating computer requesting the credentials. The bottom portion (424) of the mobile device user interface (420) requests authorization from the user to send the credentials. If the user wishes to authorize the transmission of the credentials, she should provide authentication information to complete the authorization. In this example, the user is required to enter a password (426). Those skilled in the art will appreciate that other manners of authenticating and/or authorization may be used, including but not limited to a personal identification number or a biometric scan (e.g., a retinal scan, a finger print reader, etc.).

Figure 5:
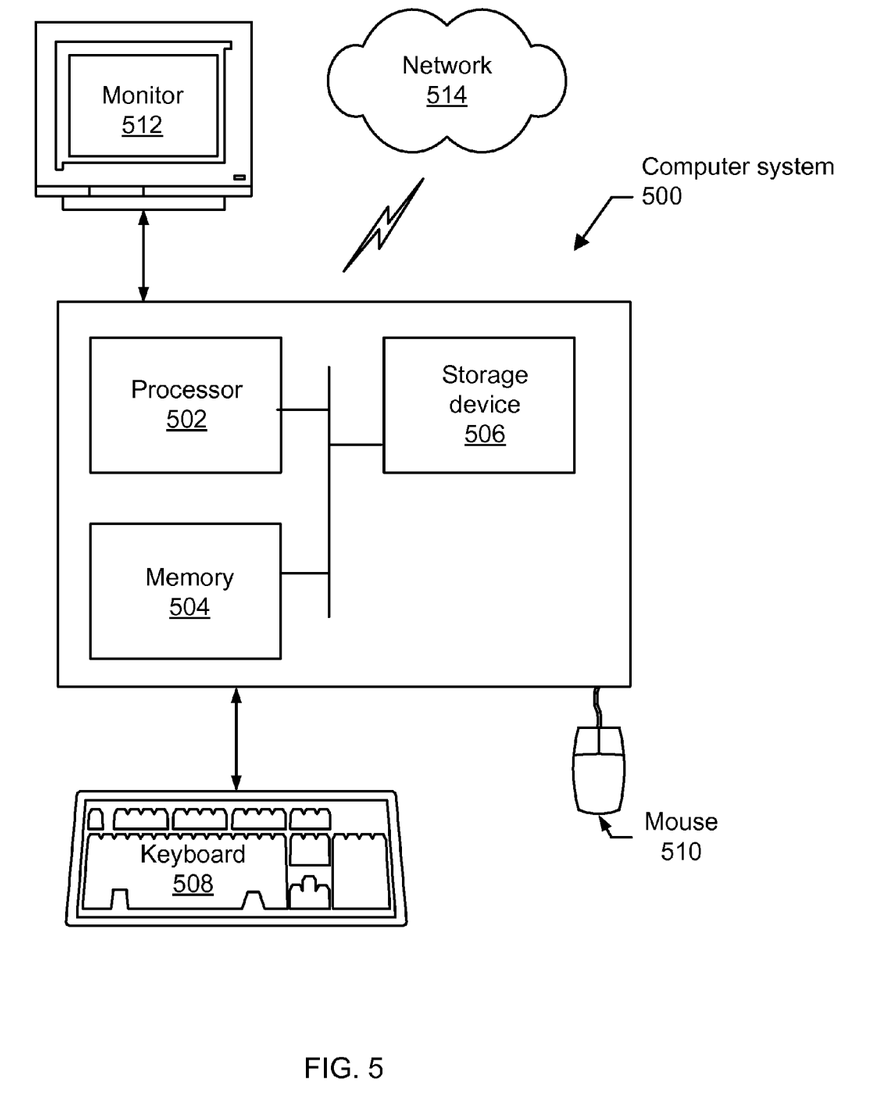
FIG. 5 shows a computer system in accordance with one or more embodiments of the invention.

Further, those skilled in the art will appreciate that one or more elements of the aforementioned computer system (500) may be located at a remote location and connected to the other elements over a network. Further, embodiments of the invention may be implemented on a distributed system having a plurality of nodes, where each portion of the invention (e.g., data processing engine, categorization engine) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, or any other computer readable storage device.

Embodiments of the invention may be implemented on virtually any type of computer regardless of the platform being used. For example, as shown in FIG. 5, a computer system (500) includes one or more processor(s) (502), associated memory (504) (e.g., random access memory (RAM), cache memory, flash memory, etc.), a storage device (506) (e.g., a hard disk, an optical drive such as a compact disk drive or digital video disk (DVD) drive, a flash memory stick, etc.), and numerous other elements and functionalities typical of today's computers (not shown). The computer (500) may also include input means, such as a keyboard (508), a mouse (510), or a microphone (not shown). Further, the computer (500) may include output means, such as a monitor (512) (e.g., a liquid crystal display (LCD), a plasma display, or cathode ray tube (CRT) monitor). The computer system (500) may be connected to a network (514) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms, now known or later developed. Generally speaking, the computer system (500) includes at least the minimal processing, input, and/or output means necessary to particularly practice embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for authenticating using a mobile device operated by a user, comprising:
   receiving, from a personal computer operated by the user, a request for access to a secure resource;
   sending a request to the personal computer for credentials required to access the secure resource;
   receiving, from the personal computer, a request from the user to obtain the credentials from the mobile device, wherein the mobile device comprises a mobile device user interface and a credential interface, and wherein the mobile device is distinct from the personal computer;
   sending, to the mobile device, a request to provide the credentials;
   receiving the credentials from the mobile device after the credential interface authenticates the user on the mobile device using input received from the mobile device user interface;
   determining that the user is authorized to access the secure resource based on the credentials; and
   providing the personal computer of the user with access to the secure resource.

2. The method of claim 1, further comprising:
   receiving a request to send the credentials to the mobile device; and
   sending the credentials to the mobile device of the user, wherein the credentials are stored on the mobile device.

3. The method of claim 2, wherein the credentials are stored on the mobile device in response to the credential interface authenticating the user on the mobile device using input received from the mobile device user interface.

4. The method of claim 1, further comprising:
modifying the credentials for the secure resource to generate revised credentials; and
sending the revised credentials to the mobile device of the user, wherein the revised credentials are stored on the mobile device.

5. The method of claim 1, wherein an application programming interface is used to establish communication with the mobile device.

6. The method of claim 1, wherein the credentials for the secure resource comprise at least one of a group consisting of a user name, a password, and a personal identification number.

7. A method for providing credentials for accessing a secure resource, comprising:
receiving, by a mobile device operated by a user, a request for credentials from a resource server configured to provide access to a secure resource,
wherein the resource server sends a request to a personal computer operated by the user to provide the credentials,
wherein the resource server is instructed by the personal computer to obtain the credentials from the mobile device, and
wherein the mobile device is distinct form the personal computer and comprises a mobile device user interface and a credential repository;
receiving, by the mobile device, approval of the request for the credentials from the user via the mobile device user interface of the mobile device, wherein the approval comprises authorization information;
retrieving, by the mobile device, the credentials from the credential repository; and
sending, by the mobile device, the credentials to the resource server after authenticating the user using the authentication information, wherein the resource server provides the personal computer of the user with access to the secure resource after authenticating the user using the credentials.

8. The method of claim 7, further comprising:
receiving a request to store the credentials;
in response to the request to store the credentials, receiving the authentication information for the user using the mobile device user interface of the mobile device;
authenticating the user based on the authentication information using the credential interface of the mobile device; and
storing the credentials after authenticating the user using the authentication information.

9. The method of claim 7, further comprising:
receiving revised credentials generated by the user;
receiving a request to store the revised credentials;
in response to the request to store the revised credentials, receiving the authentication information for the user using the mobile device user interface of the mobile device;
authenticating the user based on the authentication information using the credential interface of the mobile device; and
storing the revised credentials after authenticating the user using the authentication information.

10. The method of claim 7, wherein an application programming interface is used to establish communication with the secure resource.

11. The method of claim 7, wherein the credentials comprise at least one of a group consisting of a user name, a password, and a personal identification number.

12. A non-transitory computer readable medium comprising instructions executable by a processor to perform a method of authenticating using a mobile device of a user, the method comprising:
receiving, from a personal computer operated by the user, a request for access to a secure resource;
sending a request to the personal computer for credentials required to access the secure resource;
receiving, from the personal computer, a request from the user to obtain the credentials from the mobile device, wherein the mobile device comprises a mobile device user interface and a credential interface, and wherein the mobile device is distinct from the personal computer;
sending, to the mobile device, a request to provide the credentials;
receiving the credentials from the mobile device after the credential interface authenticates the user on the mobile device using input received from the mobile device user interface;
determining that the user is authorized to access the secure resource based on the credentials; and
providing the personal computer of the user with access to the secure resource.

13. The non-transitory computer readable medium of claim 12, further comprising:
receiving a request to send the credentials to the mobile device; and
sending the credentials to the mobile device of the user, wherein the credentials are stored on the mobile device.

14. The non-transitory computer readable medium of claim 13, wherein the credentials are stored on the mobile device in response to the credential interface authenticating the user on the mobile device using input received from the mobile device user interface.

15. The non-transitory computer readable medium of claim 12, further comprising:
modifying the credentials for the secure resource to generate revised credentials; and
sending the revised credentials to the mobile device of the user, wherein the revised credentials are stored on the mobile device.

16. The non-transitory computer readable medium of claim 12, wherein an application programming interface is used to establish communication with the mobile device.

17. The non-transitory computer readable medium of claim 12, wherein the credentials for the secure resource comprise at least one of a group consisting of a user name, a password, and a personal identification number.

18. A non-transitory computer readable medium comprising instructions executable by a processor to perform a method of providing credentials for accessing a secure resource, the method comprising:
receiving, using a mobile device operated by a user, a request for credentials from a resource server configured to provide access to a secure resource,
wherein the resource server sends a request to a personal computer operated by the user to provide the credentials,
wherein the resource server is instructed by the personal computer to obtain the credentials from the mobile device, and
wherein the mobile device is distinct form the personal computer and comprises a mobile device user interface and a credential repository;

receiving approval of the request for the credentials from the user via the mobile device user interface of the mobile device, wherein the approval comprises authentication information;

retrieving the credentials from the credential repository; and sending the credentials to the resource server after authenticating the user using the authentication information, wherein the resource server provides the personal computer of the user with access to the secure resource after authenticating the user using the credentials.

19. The non-transitory computer readable medium of claim 18, further comprising:

receiving a request to store the credentials;

in response to the request to store the credentials, receiving the authentication information for the user using the mobile device user interface of the mobile device;

authenticating the user based on the authentication information using the credential interface of the mobile device; and storing the credentials after authenticating the user using the authentication information.

20. The non-transitory computer readable medium of claim 18, further comprising:

receiving revised credentials generated by the user;

receiving a request to store the revised credentials;

in response to the request to store the revised credentials, receiving the authentication information for the user using the mobile device user interface of the mobile device;

authenticating the user based on the authentication information using the credential interface of the mobile device; and storing the revised credentials after authenticating the user using the authentication information.

21. The non-transitory computer readable medium of claim 20, further comprising:

in response to the request for the credentials and to receiving the authentication information from the credential interface of the mobile device to send the credentials, sending the revised credentials to the secure resource, wherein the server provides the user with access to the secure resource after authenticating the user using the credentials.

22. The non-transitory computer readable medium of claim 18, wherein an application programming interface is used to establish communication with the secure resource.

23. The non-transitory computer readable medium of claim 18, wherein the credentials comprise at least one of a group consisting of a user name, a password, and a personal identification number.

24. A system for authenticating using a mobile device, comprising:

memory; and a processor for executing:

a user application configured to:

receive, from a personal computer operated by a user, at least one instruction to obtain credentials from the mobile device, wherein the credentials are required to access a secure resource on a resource server;

send a request for the credentials to the mobile device, wherein the mobile device comprises a mobile device user interface and a credential interface; and receive the credentials from the mobile device after the credential interface authenticates the user on the mobile device using input received from the mobile device user interface; and a security interface configured to:

receive a request for access to the secure resource from the personal computer;

send to the personal computer a request for the credentials;

receive the credentials for the secure resource;

send the credentials to the resource server; and receive from the resource server access to the secure resource based on the credentials, wherein access is sent to the personal computer.

25. A system of claim 24, wherein the mobile device comprises:

a credential repository configured to store the credentials.

26. The system of claim 25, wherein:

the mobile device user interface is further configured to:

receive the credentials from the user; and receive a request from the user to store the credentials on the mobile device; and in response to the request from the user to store the credentials on the mobile device:

the user application is further configured to:

receive the credentials from the user interface; and send the credentials to the credential interface; and the credential repository is further configured to:

receive the credentials from the credential interface for storage.

27. The method of claim 26, wherein the credentials are stored in the credential repository in response to the user being authenticated on the mobile device.

28. The system of claim 24, wherein the resource server is configured to:

receive the credentials from the credential interface of the mobile device; and send access to the secure resource to the credential interface.

29. The system of claim 24, wherein the mobile device user interface is further configured to:

receive from the user a modification to the credentials to generate revised credentials; and receive a request from the user to store the revised credentials in the credential repository.

30. The system of claim 29, wherein the user application is further configured to:

receive the revised credentials from the credential interface in response to the request for the credentials; and send the revised credentials to the resource server; and receive from the resource server access to the secure resource using the revised credentials.

31. The system of claim 24, wherein the user application and the credential interface communicate using a wireless network.

32. The system of claim 24, wherein the mobile device further comprises:

a security module configured to prevent operation of the mobile device without authentication provided by the user.

* * * * *